(No Model.)
T. J. PAYNE.
CULTIVATOR.
No. 544,114. Patented Aug. 6, 1895.
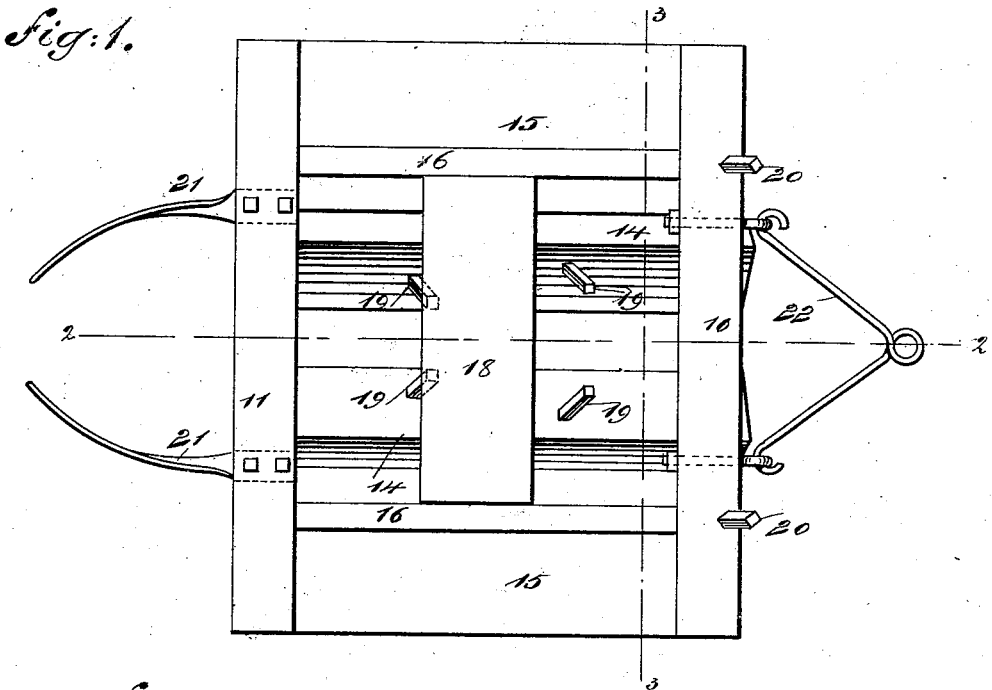
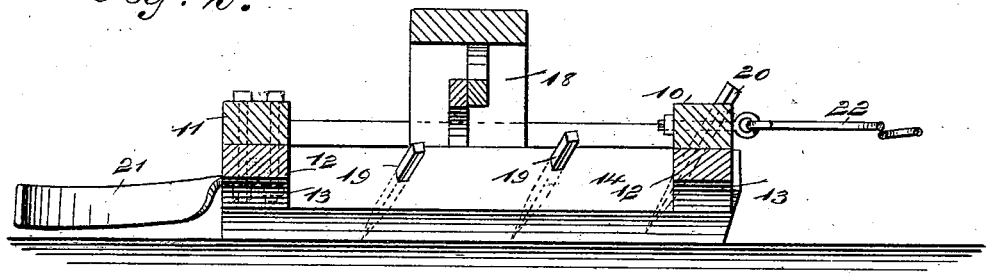
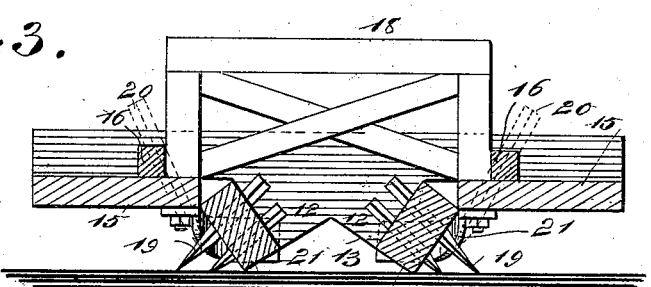
WITNESSES:
Chas. Nida.
J. Fred. Acker.
INVENTOR
T. J. Payne
BY Munn & Co.
ATTORNEYS.

UNITED STATES PATENT OFFICE.

THOMAS J. PAYNE, OF TECUMSEH, OKLAHOMA TERRITORY.

CULTIVATOR.

SPECIFICATION forming part of Letters Patent No. 544,114, dated August 6, 1895.

Application filed December 24, 1894. Serial No. 532,854. (No model.)

*To all whom it may concern:*

Be it known that I, THOMAS J. PAYNE, of Tecumseh, in the county of Pottawatomie and Territory of Oklahoma, have invented a new and Improved Cultivator, of which the following is a full, clear, and exact description.

My invention relates to an improvement in cultivators, especially to cultivators adapted for the cultivation of listed corn; and the object of this invention is to provide a cultivator having runners so formed and located that they will fit closely in a furrow, the said runners being provided with teeth capable of pulverizing the soil in an effective manner.

A further object of the invention is to provide knives at the rear of the cultivator which will cut off the outward edges of the furrow or that portion of the furrow where the weeds usually start first to grow; and a further object of the invention is to provide a cultivator which will be exceedingly simple, durable, and economic in its construction as well as light of draft.

The invention consists in the novel construction and combination of the several parts, as will be hereinafter fully set forth and pointed out in the claims.

Reference is to be had to the accompanying drawings, forming a part of this specification, in which similar figures of reference indicate corresponding parts in all the views.

Figure 1 is a plan view of the improved cultivator. Fig. 2 is a section taken vertically on the line 2 2 of Fig. 1, and Fig. 3 is a vertical section taken at right angles to the section shown in Fig. 2 and upon the line 3 3 of Fig. 1.

In carrying out the invention the frame of the cultivator consists of a forward and a rear cross-bar, designated, respectively, at 10 and 11, each of which cross-bars is provided at each side of its center with an angular extension 12, (shown in Fig. 3,) whereby a triangular space 13 is formed in the under central surface of each cross-bar in order that the growing plants may be properly cleared, the spaces 13 being located over the hills under cultivation. A longitudinal beam 14 is attached to the outer side surface of each of the extensions 12 of the cross-bars, the said beams 14 being virtually runners, and they extend from the front cross-bar to the rear thereof. These runners or beams are rectangular in cross-section and are inclined in direction of each other at their lower edges, and their under surfaces stand at angles to the horizontal and form continuations of the said sides of the triangular spaces 13 at the front and rear of the frame, whereby the said runners travel upon their lower outer marginal edges, as shown in Fig. 3. In this manner the runners fit down well in the furrow, while the hills are not touched, or the small plants, owing to the spaces 13.

A platform 15 is made to extend from one cross-bar to the other at each side of the central extension thereof, and longitudinal braces 16 are usually fixed upon the said platforms, while the space between the two platforms at the center of the frame is bridged by a seat 18 of any approved construction. The runners 14 are provided with cultivator-teeth 19, which extend through them in an outwardly and downwardly direction, the said teeth being polygonal or square in cross-section, and they are pointed at their lower ends. They are preferably so arranged that one tooth in each runner will be back of the other, and similar teeth 20 are usually projected downward and inwardly in direction of each other through the forward cross-bar of the frame, as shown in all of the views.

A knife or scraper 21 is secured to each platform 15 at the rear end of the frame, one knife adjacent to the outer upper surface of each runner, and these knives are curved at their free ends in direction of each other, the cutting-edges being the lower edges. In this manner as the cultivator is drawn over a row of small corn the teeth will pulverize and thoroughly cultivate the ground in the furrows, since the runners are especially adapted to the formation of the furrows, and the knives, following the teeth, will cut or scrape off the outward edges of the furrow being cultivated or that portion of the furrow where the weeds usually first start to grow. A clevis or draft-yoke 22 is pivotally connected with the front of the frame over the central portion of the same.

Having thus described my invention, I claim as new and desire to secure by Letters Patent—

1. In a cultivator, a frame comprising a front and a rear cross bar, each of the said cross bars being provided with an angular extension at each side of the central portion of its lower edge, forming thereby a central triangular opening in said edge, runners attached to the outer surfaces of corresponding extensions of the cross bars, the lower edges of the runners forming continuations of said extensions and being inclined in direction of each other, and teeth carried by the said runners, substantially as shown and described.

2. In a cultivator, the combination, with a frame, comprising a forward and a rear cross bar, said cross bars being each widest at the center and provided in the lower edge of their central portion with a triangular opening, runners extending from the outer edges of the wider portions of the cross bars and forming continuations of the sides of said triangular openings therein, the runners being diagonally located, inclining at their lower edges in direction of each other, the said runners being also polygonal in cross section, and having their lower edges at angles to the horizontal teeth projected from the runners in an outwardly and downwardly direction, and knives located one at each side of the widest portion of the rear cross bar, said knives being curved in direction of each other, substantially as and for the purpose specified.

THOMAS J. PAYNE.

Witnesses:
C. J. BENSON,
W. S. SEARCH.